United States Patent
Takata

(10) Patent No.: US 11,052,708 B2
(45) Date of Patent: Jul. 6, 2021

(54) PNEUMATIC TIRE

(71) Applicant: The Yokohama Rubber Co., LTD., Tokyo (JP)

(72) Inventor: Mina Takata, Hiratsuka (JP)

(73) Assignee: The Yokohama Rubber Co., LTD.

( * ) Notice: Subject to any disclaimer, the term of this patent is extended or adjusted under 35 U.S.C. 154(b) by 0 days.

(21) Appl. No.: 16/088,425

(22) PCT Filed: Feb. 14, 2017

(86) PCT No.: PCT/JP2017/005387
§ 371 (c)(1),
(2) Date: Sep. 25, 2018

(87) PCT Pub. No.: WO2017/169214
PCT Pub. Date: Oct. 5, 2017

(65) Prior Publication Data
US 2019/0337336 A1    Nov. 7, 2019

(30) Foreign Application Priority Data

Mar. 30, 2016   (JP) .............................. JP2016-069090

(51) Int. Cl.
*B60C 13/02*    (2006.01)
*B60C 11/02*    (2006.01)
*B60C 25/05*    (2006.01)

(52) U.S. Cl.
CPC .............. *B60C 11/02* (2013.01); *B60C 13/02* (2013.01); *B60C 25/0533* (2013.01)

(58) Field of Classification Search
CPC ..... B60C 13/00; B60C 13/001; B60C 13/002; B60C 13/02; B60C 13/023
See application file for complete search history.

(56) References Cited

U.S. PATENT DOCUMENTS 9,174,499 B2   11/2015   Yamaguchi
10,239,360 B2   3/2019   Fujioka
(Continued)

FOREIGN PATENT DOCUMENTS

JP    S58-121701    8/1983
JP    H09-300920    11/1997
(Continued)

OTHER PUBLICATIONS

Machine translation of JP 2013-6572, 2013.*
(Continued)

*Primary Examiner* — Justin R Fischer
(74) *Attorney, Agent, or Firm* — Thorpe North & Western

(57) ABSTRACT

A pneumatic tire includes: a protrusion portion projecting outward in a tire lateral direction disposed in a buttress portion; and a linear portion with a linear shape when viewed in a tire meridian cross section, the linear portion constituting a surface of the protrusion portion at a position inward in a tire radial direction from a corner portion, the corner portion being an end portion of the protrusion portion outward in the tire lateral direction; the corner portion being located within a retreading development width position, which is a range in the tire radial direction in which a boundary for removing a tread when retreading is located; and the linear portion having an angle ranging from 45° to 90° with respect to a horizontal line parallel with a tire rotation axis at a position inward of the linear portion in the tire lateral direction.

5 Claims, 7 Drawing Sheets

(56) References Cited

U.S. PATENT DOCUMENTS

| | | |
|---|---|---|
| 2010/0258225 A1 | 10/2010 | Ogawa |
| 2013/0333818 A1 | 12/2013 | Yamaguchi |
| 2015/0336428 A1 | 11/2015 | Ito |
| 2016/0129733 A1* | 5/2016 | Fujioka .................. B60C 11/11 152/209.18 |

FOREIGN PATENT DOCUMENTS

| | | | |
|---|---|---|---|
| JP | 2003-112505 | * | 4/2003 |
| JP | 2003-244830 | | 8/2003 |
| JP | 2004-098953 | | 4/2004 |
| JP | 2005-263055 | | 9/2005 |
| JP | 2009-208641 | | 9/2009 |
| JP | 2011-218907 | | 11/2011 |
| JP | 2012-017061 | | 1/2012 |
| JP | 2012-066662 | | 4/2012 |
| JP | 2013-6572 | * | 1/2013 |
| JP | 2014-019310 | | 2/2014 |
| JP | 2014-076769 | | 5/2014 |
| JP | 5750541 | | 7/2015 |
| KR | 2010123226 | * | 11/2010 |
| WO | WO 2008/114668 | | 9/2008 |
| WO | WO 2009/054408 | | 4/2009 |
| WO | WO 2014/103070 | | 7/2014 |

OTHER PUBLICATIONS

Machine translation of JP 2003-112505, 2003.*
International Search Report for International Application No. PCT/JP2017/005387 dated May 16, 2017, 4 pages, Japan.

* cited by examiner

|  | CONVENTIONAL EXAMPLE 1 | CONVENTIONAL EXAMPLE 2 | COMPARATIVE EXAMPLE 1 | COMPARATIVE EXAMPLE 2 |
|---|---|---|---|---|
| SHOULDER SHAPE | SQUARE | SEMI-ROUND | PROTRUSION PORTION SHAPE AT RETREAD POSITION | PROTRUSION PORTION SHAPE AT RETREAD POSITION |
| PROFILE OF PROTRUSION PORTION INWARD IN RADIAL DIRECTION | CURVED INWARD IN LATERAL DIRECTION | CURVED OUTWARD IN LATERAL DIRECTION | CURVED OUTWARD IN LATERAL DIRECTION | CURVED INWARD IN LATERAL DIRECTION |
| α (°) | - | - | - | - |
| PROTRUSION PORTION OPENING POSITION | - | - | TREAD END PORTION | TREAD END PORTION |
| PROFILE OF PROTRUSION PORTION OUTWARD IN RADIAL DIRECTION | - | - | CURVED OUTWARD IN LATERAL DIRECTION | CURVED OUTWARD IN LATERAL DIRECTION |
| L (mm) | -5 | -5 | -5 | -5 |
| HEAT BUILD-UP RESISTANCE | 100 | 82 | 83 | 90 |
| ENSURING RETREAD WIDTH | 100 | 110 | 110 | 110 |
| RIGIDITY OF RETREAD TREAD END PORTION | 100 | 116 | 111 | 101 |

FIG. 6A

|  | COMPARATIVE EXAMPLE 3 | COMPARATIVE EXAMPLE 4 | EXAMPLE 1 | EXAMPLE 2 |
|---|---|---|---|---|
| SHOULDER SHAPE | PROTRUSION PORTION SHAPE AT RETREAD POSITION | PROTRUSION PORTION SHAPE AT RETREAD POSITION | PROTRUSION PORTION SHAPE AT RETREAD POSITION | PROTRUSION PORTION SHAPE AT RETREAD POSITION |
| PROFILE OF PROTRUSION PORTION INWARD IN RADIAL DIRECTION | STRAIGHT LINE | STRAIGHT LINE | STRAIGHT LINE | STRAIGHT LINE |
| α (°) | 30 | 130 | 70 | 70 |
| PROTRUSION PORTION OPENING POSITION | TREAD END PORTION | TREAD END PORTION | TREAD END PORTION | INWARD FROM TREAD END PORTION IN RADIAL DIRECTION |
| PROFILE OF PROTRUSION PORTION OUTWARD IN RADIAL DIRECTION | CURVED OUTWARD IN LATERAL DIRECTION | CURVED OUTWARD IN LATERAL DIRECTION | CURVED OUTWARD IN LATERAL DIRECTION | CURVED OUTWARD IN LATERAL DIRECTION |
| L (mm) | -5 | -5 | -5 | -5 |
| HEAT BUILD-UP RESISTANCE | 89 | 85 | 88 | 89 |
| ENSURING RETREAD WIDTH | 110 | 110 | 110 | 110 |
| RIGIDITY OF RETREAD TREAD END PORTION | 108 | 115 | 113 | 113 |

FIG. 6B

|  | EXAMPLE 3 | EXAMPLE 4 | EXAMPLE 5 | EXAMPLE 6 |
|---|---|---|---|---|
| SHOULDER SHAPE | PROTRUSION PORTION SHAPE AT RETREAD POSITION | PROTRUSION PORTION SHAPE AT RETREAD POSITION | PROTRUSION PORTION SHAPE AT RETREAD POSITION | PROTRUSION PORTION SHAPE AT RETREAD POSITION |
| PROFILE OF PROTRUSION PORTION INWARD IN RADIAL DIRECTION | STRAIGHT LINE | STRAIGHT LINE | STRAIGHT LINE | STRAIGHT LINE |
| α (°) | 70 | 70 | 70 | 70 |
| PROTRUSION PORTION OPENING POSITION | INWARD FROM TREAD END PORTION IN RADIAL DIRECTION | INWARD FROM TREAD END PORTION IN RADIAL DIRECTION | INWARD FROM TREAD END PORTION IN RADIAL DIRECTION | INWARD FROM TREAD END PORTION IN RADIAL DIRECTION |
| PROFILE OF PROTRUSION PORTION OUTWARD IN RADIAL DIRECTION | STRAIGHT LINE | CURVED INWARD IN LATERAL DIRECTION | CURVED INWARD IN LATERAL DIRECTION | CURVED INWARD IN LATERAL DIRECTION |
| L (mm) | -5 | -5 | 20 | 40 |
| HEAT BUILD-UP RESISTANCE | 90 | 91 | 94 | 95 |
| ENSURING RETREAD WIDTH | 110 | 110 | 110 | 103 |
| RIGIDITY OF RETREAD TREAD END PORTION | 113 | 113 | 112 | 110 |

FIG. 6C

PNEUMATIC TIRE

TECHNICAL FIELD

The present technology relates to a pneumatic tire.

BACKGROUND ART

In the related art of pneumatic tires, a tire for retreading is known. When the tread of such a tire reaches the end of its service life with the groove depth of a groove formed in the tread being less than a predetermined depth, a tread rubber can be replaced and the tire can be reused. For example, a pneumatic tire for retreading described in Japan Unexamined Patent Publication No. 2004-098953 includes a semicircular projection at a buffing intended point on the surface of a buttress portion. This configuration allows buffing, i.e., removing of the worn tread, to be performed appropriately and increases the accuracy of the bonded tread surface.

In many known pneumatic tires for retreading, a wide precure is used as the precure tread, i.e., tread for replacing, and a development width sufficient for bonding the wide precure tread is ensured. Thus, the area from the tread edge to the buttress portion is curved in a manner projecting outward in the tire lateral direction. However, the volume of rubber constituting the buttress portion region is greater in a configuration in which the area from the tread edge to the buttress portion is curved in a manner projecting outward in the tire lateral direction than in a configuration in which the buttress shape does not project outward in the tire lateral direction. Thus, heat build-up resistance is decreased. However, a development width sufficient for bonding the wide precure tread for retreading is difficult to achieve with a configuration in which the area from the tread edge to the buttress portion is not curved in a manner projecting outward in the tire lateral direction. In this way, it is extremely difficult to ensure a retreading development width sufficient for bonding the precure tread while suppressing a decrease in heat build-up resistance.

SUMMARY

The present technology provides a pneumatic tire that can ensure a retreading development width while suppressing a decrease in heat build-up resistance.

A pneumatic tire according to an embodiment of the present technology includes:

a protrusion portion projecting outward in a tire lateral direction disposed in a buttress portion; and a linear portion with a linear shape when viewed in a tire meridian cross section, the linear portion constituting a surface of the protrusion portion at a position inward in a tire radial direction from a corner portion, the corner portion being an end portion of the protrusion portion outward in the tire lateral direction;

the corner portion being located within a retreading development width position, which is a range in the tire radial direction in which a boundary for removing a tread when retreading is located; and the linear portion having an angle ranging from 45° to 90° with respect to an imaginary line parallel with a tire rotation axis at a position inward of the linear portion in the tire lateral direction.

In the pneumatic tire described above, preferably the protrusion portion includes a curved portion constituting a surface of the protrusion portion at a position outward from the corner portion in the tire radial direction, the curved portion being curved, projecting inward in a cross-sectional direction when viewed in the tire meridian cross section.

In the pneumatic tire described above, preferably the curved portion includes an end portion on a side opposite an end portion located closer to the corner portion, the end portion being located inward in the tire radial direction from an end portion of a tread contact surface in the tire lateral direction.

In the pneumatic tire described above, preferably a distance L in the tire lateral direction from a carcass outer end portion, which is an outermost portion of a carcass in the tire lateral direction, to the corner portion is in a range 0 mm≤L≤30 mm; and a distance L' in the tire lateral direction from an inner end portion of the linear portion in the tire radial direction to the carcass outer end portion is in a range 0 mm≤L'≤30 mm.

A pneumatic tire according to the present technology achieves the effects of ensuring a retreading development width while suppressing a decrease in heat build-up resistance.

BRIEF DESCRIPTION OF DRAWINGS

FIG. 6A is a table showing the results of performance tests of pneumatic tires.

FIG. 6B is a table showing the results of performance tests of pneumatic tires.

FIG. 6C is a table showing the results of performance tests of pneumatic tires.

DETAILED DESCRIPTION

Pneumatic tires according to embodiments of the present technology are described in detail below with reference to the drawings. However, the technology is not limited to these embodiments. Constituents of the following embodiments include elements that are essentially identical or that can be substituted or easily conceived by one skilled in the art.

Herein, "tire lateral direction" refers to the direction that is parallel with a rotation axis of a pneumatic tire. "Inward in the tire lateral direction" refers to the direction toward the tire equatorial plane in the tire lateral direction. "Outward in the tire lateral direction" refers to the direction opposite the direction toward the tire equatorial plane in the tire lateral direction. Furthermore, "tire radial direction" refers to the direction orthogonal to the tire rotation axis. "Inward in the tire radial direction" refers to the direction toward the tire rotation axis in the tire radial direction. "Outward in the tire radial direction" refers to the direction away from the tire rotation axis in the tire radial direction. "Tire circumferential direction" refers to the direction of rotation about the tire rotation axis.

Figure 1:
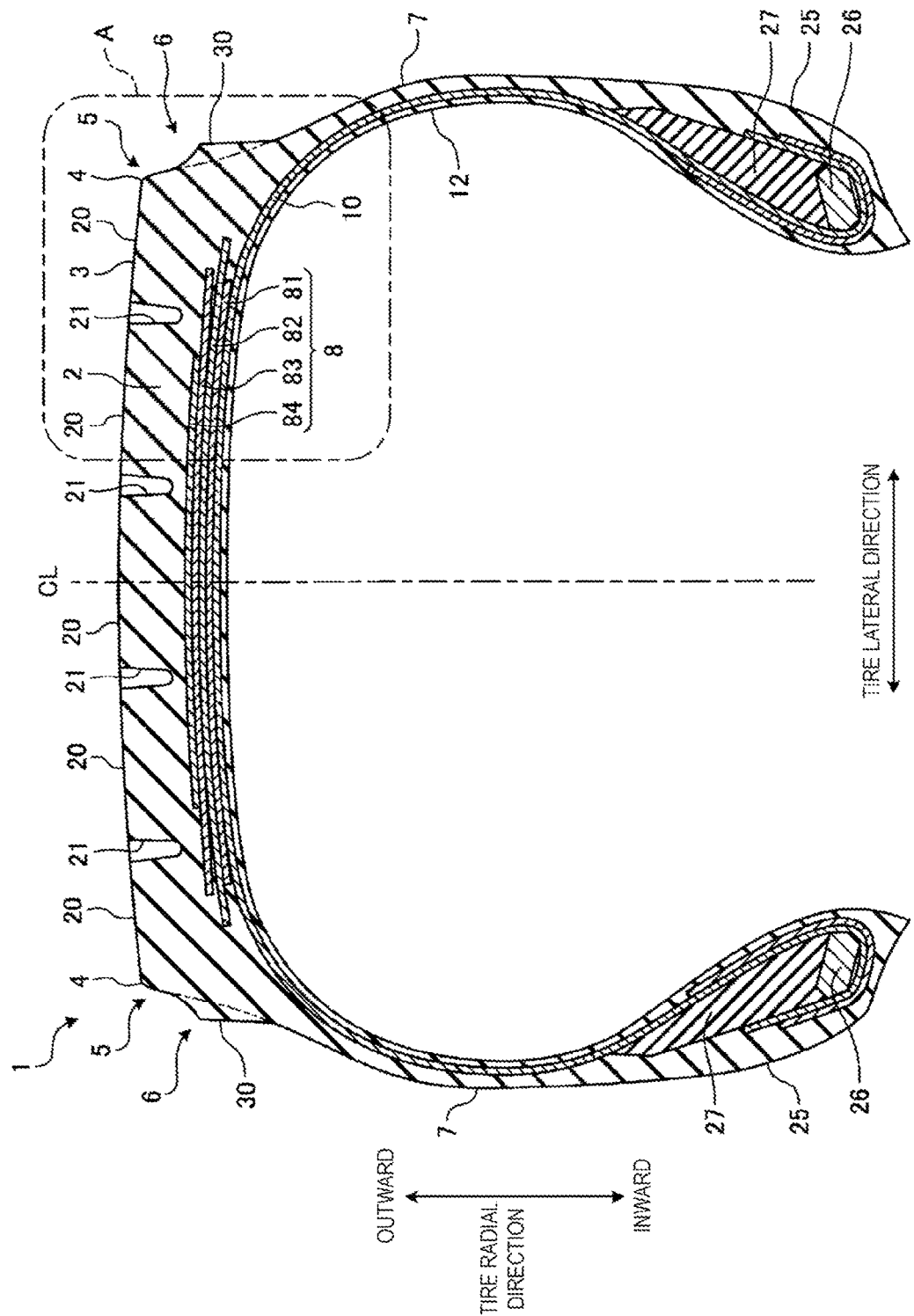
FIG. 1 is a meridian cross-sectional view illustrating a main portion of a pneumatic tire according to an embodiment.

FIG. 1 is a meridian cross-sectional view illustrating a main portion of a pneumatic tire 1 according to an embodiment. The pneumatic tire 1 illustrated in FIG. 1, in a meridian cross-sectional view, is provided with a tread 2 in the outermost portion in the tire radial direction. The surface of the tread 2, i.e., the portion that comes into contact with the road surface when a vehicle (not illustrated) mounted with the pneumatic tire 1 travels, is formed as a tread contact surface 3. A plurality of circumferential main grooves 21 extending in a tire circumferential direction are formed in the tread contact surface 3, and a plurality of lug grooves (not illustrated) crossing the circumferential main grooves 21 are formed in the tread contact surface 3. A plurality of land portions 20 are defined by the circumferential main grooves 21 and the lug grooves in the tread contact surface 3.

Note that the number of the circumferential main grooves 21, the interval between the lug grooves in the tire circumferential direction, the length and angle of the lug grooves, the groove width and groove depth of the grooves, and the like are preferably set as appropriate. That is, the so-called tread pattern formed in the tread contact surface 3 is preferably set as appropriate. The pneumatic tire 1 according to an embodiment of the present technology is a tire for retreading. When the tread 2 reaches the end of its service life, with the tread contact surface 3 being worn such that the groove depth of a circumferential main groove 21 or another groove is less than a predetermined depth, the tread rubber constituting the tread 2 can be replaced and the tire reused.

The ends of the tread 2 in the tire lateral direction are formed as shoulder portions 5. Sidewall portions 7 are disposed ranging from the shoulder portions 5 to predetermined positions inward in the tire radial direction. In other words, the sidewall portions 7 are disposed at two sections on either side of the pneumatic tire 1 in the tire lateral direction.

Furthermore, a bead portion 25 is located inward of each sidewall portion 7 in the tire radial direction. The bead portions 25 are disposed at two sections on either side of a tire equatorial plane CL in a similar manner to that of the sidewall portions 7. That is, the pair of bead portions 25 are disposed on either side of the tire equatorial plane CL in the tire lateral direction. The pair of bead portions 25 are each provided with a bead core 26, and a bead filler 27 is provided outward of each bead core 26 in the tire radial direction. The bead core 26 is formed by winding a bead wire, which is a steel wire, into an annular shape. The bead filler 27 is a rubber material that is disposed in the space formed by an end of a carcass 10 (described below) in the tire lateral direction being folded back outward in the tire lateral direction at the position of the bead core 26.

The bead portion 25 is configured to be mountable on a specified rim of 15° taper. Here, "specified rim" refers to an "applicable rim" defined by the Japan Automobile Tyre Manufacturers Association (JATMA), a "Design Rim" defined by the Tire and Rim Association (TRA), or a "Measuring Rim" defined by the European Tyre and Rim Technical Organisation (ETRTO). That is, the pneumatic tire 1 according to an embodiment of the present embodiment can be mounted on a specified rim with the portion that engages with the bead portion 25 being inclined at an inclination angle of 15° with respect to the rotation axis.

A belt layer 8 is provided inward of the tread 2 in the tire radial direction. The belt layer 8 has a multilayer structure including four layered belts 81, 82, 83, 84. The belts 81, 82, 83, 84 are made by performing a process of covering a plurality of belt cords made of steel or an organic fiber material such as polyester, rayon, and nylon with rubber coating and then a rolling process. Furthermore, the belts 81, 82, 83, 84 have different set inclination angles of the fiber direction of the belt cords with respect to the tire circumferential direction, and the belts are layered so that the fiber directions of the belt cords intersect each other, i.e., a crossply structure.

The carcass 10 is provided in a continuous manner inward of the belt layer 8 in the tire radial direction and on the tire equatorial plane CL side of the sidewall portions 7 and includes radial ply cords. The carcass 10 has a single layer structure made of one carcass ply or a multilayer structure made of a plurality of carcass plies, and extends between the bead cores 26 on either side in the tire lateral direction in a toroidal shape, forming the framework of the tire. Specifically, the carcass 10 is disposed from one bead portion 25 to the other bead portion 25 located on either side in the tire lateral direction, and turns back outward in the tire lateral direction along the bead portions 25 and the bead cores 26, wrapping around the bead cores 26 and the bead fillers 27. Additionally, the carcass ply of the carcass 10 is made by a process of covering a plurality of carcass cords made of steel or an organic fiber material such as aramid, nylon, polyester, and rayon with a coating rubber and then a rolling process.

Additionally, an innerliner 12 is formed along the carcass 10 inward of the carcass 10 or on the inner side of the carcass 10 in the pneumatic tire 1.

Figure 2:
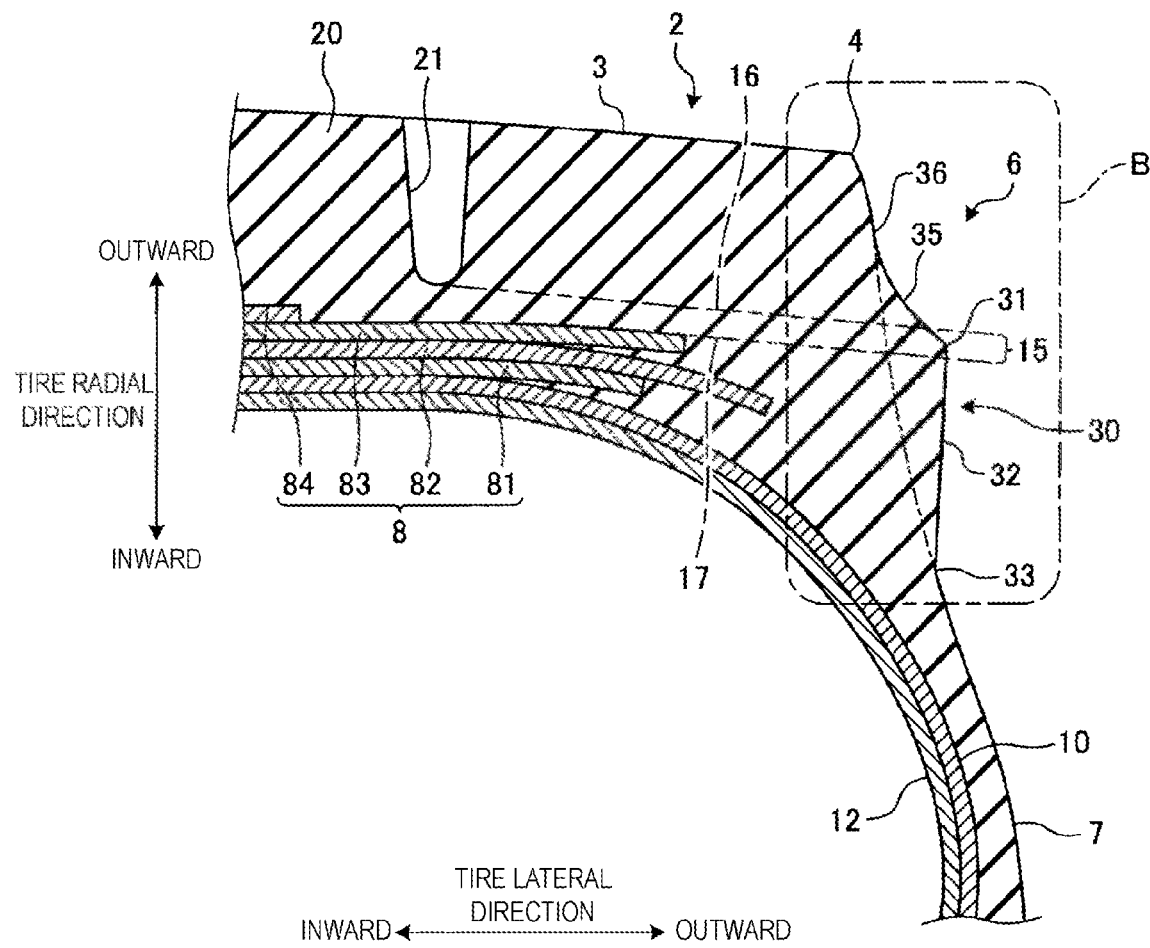
FIG. 2 is a detailed view of portion A of FIG. 1.

FIG. 2 is a detailed view of portion A of FIG. 1. A buttress portion 6 is the portion located on either side of the tread 2 in the tire lateral direction that faces outward in the tire lateral direction or the portion of the sidewall portion 7 in the upper end region in the tire radial direction. The buttress portion 6 is provided with a protrusion portion 30 projecting outward in the tire lateral direction. The protrusion portion 30 includes a corner portion 31, which is the outer end portion in the tire lateral direction, and a curved portion 35 located outward of the corner portion 31 in the tire radial direction. A linear portion 32 is provided located inward of the corner portion 31 in the tire radial direction. The corner portion 31 is the portion of the protrusion portion 30 located outermost in the tire lateral direction. The corner portion 31 is located within a retreading development width position 15, which is the range in the tire radial direction in which the boundary for removing the tread 2 upon retreading is located. The retreading development width position 15 is the region defined by a groove bottom side reference line 16 and a belt side reference line 17, and is the region between the groove bottom side reference line 16 and the belt side reference line 17. Additionally, the retreading development width position 15 is also the region where a retreading development width is located. The retreading development width is the width in the tire lateral direction of the portion where the new tread rubber is bonded after the tread 2 is removed upon retreading. That is, the retreading development width position 15 is the region where the portion corresponding to the outer circumferential surface of a base tire, which is the pneumatic tire 1 with the tread 2 removed upon retreading, is located.

The groove bottom side reference line 16 that defines the retreading development width position 15 is an imaginary line parallel with the tread profile, which is the profile of the tread contact surface 3, running from the groove bottom of the outermost circumferential main groove 21 in the tire lateral direction. The belt side reference line 17 is an imaginary line parallel with the tread profile, running from the end in the tire lateral direction of the belt 83 corresponding to the outermost layer located in the region in the tire lateral direction that the outermost circumferential main groove 21 in the tire lateral direction is located in. That is, the belt side reference line 17 is an imaginary line parallel with the tread profile, running from the end of the belt 83 located below, in the tire radial direction, the circumferential main groove 21 used as a reference for the groove bottom side reference line 16.

Note that tread profile in such a configuration refers to the profile of the tread contact surface 3 when the pneumatic tire 1 is mounted on a specified rim, the pneumatic tire 1 is inflated to the specified internal pressure, and in an unloaded state with no load. "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

The retreading development width position 15 is the region between the groove bottom side reference line 16 and the belt side reference line 17. Upon retreading, the tread 2 is removed from the outer circumferential surface to a position within the range of the retreading development width position 15. The protrusion portion 30 is formed in such a shape that the corner portion 31 is located within the retreading development width position 15.

The curved portion 35 constitutes the surface of the protrusion portion 30 at a position outward from the corner portion 31 in the tire radial direction and is curved to project inward in the cross-sectional direction when viewed in a tire meridian cross section. That is, the curved portion 35 is curved to project inward in the tire lateral direction or the tire radial direction. Thus, the curved portion 35 has a recessed shape when viewed from the surface side. The curved portion 35 includes an end portion 36 on the side opposite the end portion located closer to the corner portion 31. The end portion 36 is located inward in the tire radial direction from an end portion 4 of the tread contact surface 3 in the tire lateral direction. That is, the curved portion 35 located outward of the corner portion 31 in the tire radial direction does not extend to a position on the tread contact surface 3, and the end portion 36 on the side opposite the end portion closer to the corner portion 31 is not connected to the end portion 4 of the tread contact surface 3 and is connected to a position near the end portion 4 of the tread contact surface 3 on the surface of the buttress portion 6.

Additionally, the linear portion 32 constitutes the surface of the protrusion portion 30 at a position inward from the corner portion 31 in the tire radial direction and has a linear shape when viewed in a tire meridian cross section. That is, the linear portion 32 is formed from the corner portion 31 extending inward in the tire radial direction.

Figure 3:
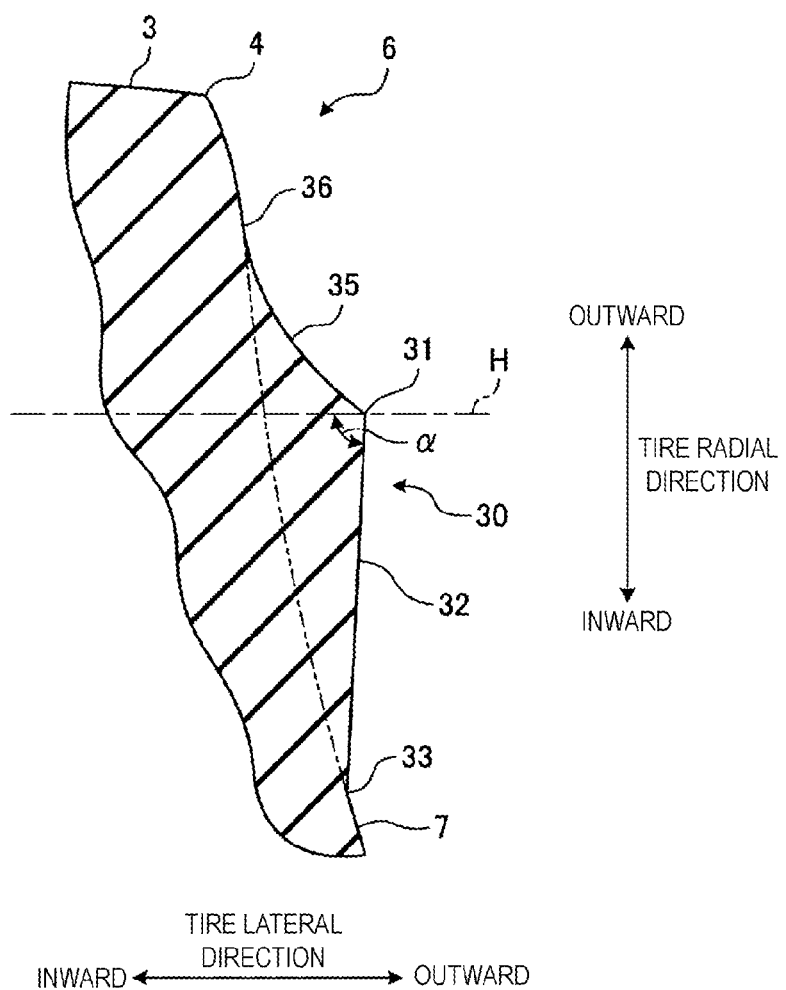
FIG. 3 is a detailed view of portion B of FIG. 2.

FIG. 3 is a detailed view of portion B of FIG. 2. The linear portion 32 extending inward in the tire radial direction is formed with an angle α at a position inward of the linear portion 32 in the tire lateral direction ranging from 45° to 90°, with respect to a horizontal line H which is an imaginary line parallel with the tire rotation axis. That is, in a configuration in which the horizontal line H is an imaginary line that passes through the corner portion 31 and is parallel with the tire rotation axis, the linear portion 32 is formed with the angle α between the inner surface of the linear portion 32 in the tire lateral direction and the horizontal line H in the range 45°≤α≤90°. Thus, the linear portion 32 extends from the corner portion 31 inward in the tire radial direction or extend from the corner portion 31 inward in the tire radial direction at an incline directed inward in the tire lateral direction. An end portion 33 of the linear portion 32 formed in this manner on the side opposite the end portion closer to the corner portion 31 is connected to the surface of the sidewall portion 7.

The corner portion 31 of the protrusion portion 30 is the portion where the linear portion 32 and the curved portion 35 connect. By the linear portion 32 and the curved portion 35 being connected, this portion bends, projecting outward in the tire lateral direction. Note that in a configuration in which the angle α between the linear portion 32 and the horizontal line H is 90°, the corner portion 31 and the linear portion 32 share the same position in the tire lateral direction, and the linear portion 32 as well as the corner portion 31 correspond to the outer end portion of the protrusion portion 30 in the tire lateral direction. In this configuration also, the corner portion 31 is the portion where the linear portion 32 and the curved portion 35 are connected.

Figure 4:
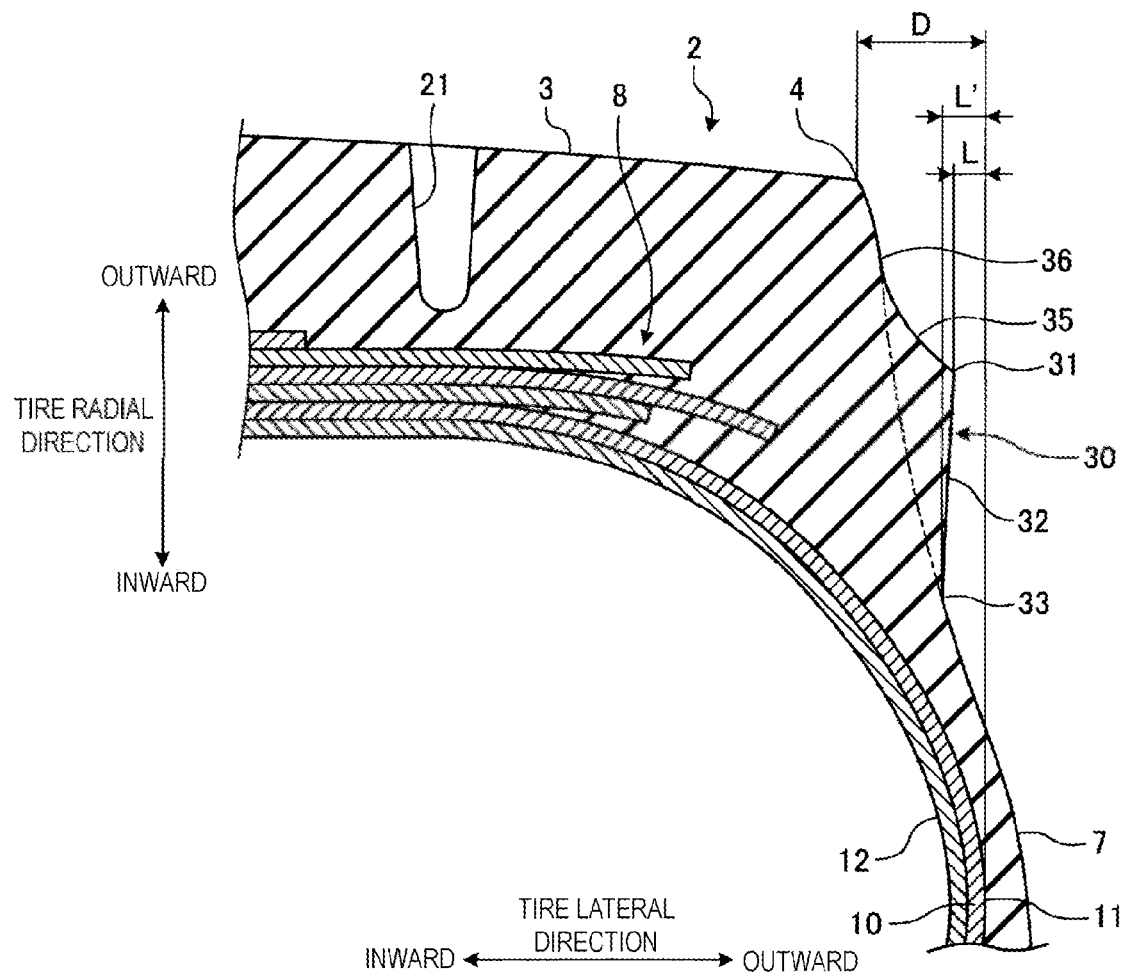
FIG. 4 is an explanatory diagram of the arrangement configuration of a protrusion portion.

FIG. 4 is an explanatory diagram of the arrangement configuration of the protrusion portion 30. In the protrusion portion 30, a distance L in the tire lateral direction from a carcass outer end portion 11, which is the outermost portion of the carcass 10 in the tire lateral direction, to the corner portion 31 is in the range 0 mm≤L≤30 mm. The carcass outer end portion 11 of such a configuration is the portion of the carcass 10 with the maximum width in the tire lateral direction, the width being measured between the portions of the carcass 10 on either side in the tire lateral direction.

Specifically, the corner portion 31 of the protrusion portion 30 shares the same position with the carcass outer end portion 11 in the tire lateral direction or is located inward from the position of the carcass outer end portion 11 in the tire lateral direction. In the protrusion portion 30, the distance L in the tire lateral direction from the corner portion 31 disposed as such and the carcass outer end portion 11 is in the range 0 mm≤L≤30 mm, and the entire protrusion portion 30 is located inward from the carcass outer end portion 11 in the tire lateral direction.

Thus, in the protrusion portion 30, the inner end portion 33 of the linear portion 32 in the tire radial direction is also located inward from the carcass outer end portion 11 in the tire lateral direction. A distance L' in the tire lateral direction from the inner end portion 33 of the linear portion 32 in the tire lateral direction to the carcass outer end portion 11 is within the range 0 mm≤L'≤30 mm. Here, the angle α between the linear portion 32 and the horizontal line H is in the range 45°≤α≤90°. Thus, the distance L in the tire lateral direction from the corner portion 31 to the carcass outer end portion 11 and the distance L' in the tire lateral direction from the end portion 33 of the linear portion 32 to the carcass outer end portion 11 have the relationship L≤L'.

Note that in the protrusion portion 30, a distance D in the tire lateral direction from the end portion 4 of the tread contact surface 3 in the tire lateral direction to the carcass outer end portion 11 and the distance L in the tire lateral direction from the corner portion 31 to the carcass outer end portion 11 preferably have a relationship within the range 0.5≤(L/D)≤0.7.

When such a pneumatic tire 1 is mounted on a vehicle and the vehicle is driven, the pneumatic tire 1 rotates while the tread contact surface 3 of the tread contact surface 3 located at the bottom comes into contact with the road surface. Friction force is produced between the ground contact portion of the tread contact surface 3 and the road surface. Thus, via this friction force between the tread contact surface 3 and the road surface, the vehicle mounted with the pneumatic tire 1 is driven with the driving force and braking force being transmitted to the road surface and turning force being generated.

Here, friction force is generated between the road surface and the tread contact surface 3 due to the tread contact surface 3 coming into contact with the road surface, and the tread contact surface 3 is gradually worn down with friction force being generated. Thus, the tread contact surface 3 of the pneumatic tire 1 is gradually worn as the distance traveled by the vehicle increases. Grooves such the circumferential main grooves 21 that contribute to drainage properties are formed in the tread contact surface 3. However, when the tread contact surface 3 becomes worn, the groove depth of the grooves becomes shallow. When the groove depth of the grooves formed in the tread contact surface 3 becomes shallow, drainage properties are reduced. Accordingly, wet performance when the vehicle travels on wet road surfaces is gradually reduced as the groove depth become shallow. In this way, when the groove depth of the grooves, which relates to wet performance and the like, decreases below a predetermined depth due to tread contact surface 3 wear, the service life of the tread 2 ends.

In the pneumatic tire 1 according to an embodiment of the present technology, when the service life of the tread 2 ends, the tread 2 is removed from the pneumatic tire 1 to obtain a base tire, and a precure tread including grooves is bonded to the surface of the base tire. As a result, the pneumatic tire 1 is retread by being newly provided with a tread 2 including grooves having a predetermined groove depth.

Specifically, when retreading is performed after the service life of the tread 2 ends, the tread 2 is gradually removed from the tread contact surface 3 side by buffing from the tread contact surface 3 side. Buffing is performed from the tread contact surface 3 inward in the tire radial direction and is performed to any position in the retreading development width position 15. That is, the boundary between the removed tread 2 and the base tire is set within the retreading development width position 15, and the tread 2 is removed by buffing to this set boundary. In this case, because the corner portion 31 is located in the retreading development width position 15, buffing removes the protrusion portion 30 from outward in the tire radial direction down to a portion near the corner portion 31.

After the tread 2 is removed from the pneumatic tire 1, a precure tread is bonded to the outer circumferential surface of the base tire. In this case, the precure tread is also bonded to the buffed surface of the protrusion portion 30. In this way, the pneumatic tire 1 is retread by being newly provided with a tread 2 including grooves such as the circumferential main grooves 21 having a groove depth capable of ensuring drainage properties.

In the pneumatic tire 1 according to an embodiment of the present technology, retreading can be performed by replacing the tread 2 in this way. However, the buttress portion 6 is provided with the protrusion portion 30 including the corner portion 31 within the retreading development width position 15. Thus, in retreading, when a precure tread is bonded to the base tire, it can also be bonded to the portion of the protrusion portion 30, ensuring the retreading development width, which is the width in the tire lateral direction of the portion the precure tread is bonded to when retreading.

The protrusion portion 30 contributes to ensuring the retreading development width in this manner. Additionally, the protrusion portion 30 is provided projecting outward from the buttress portion 6 in the tire lateral direction, and because the angle α of the linear portion 32 of the protrusion portion 30 with respect to the horizontal line H is in the range 45°≤α≤90°, the retreading development width can be ensured without an increase in the amount of rubber.

Figure 5:
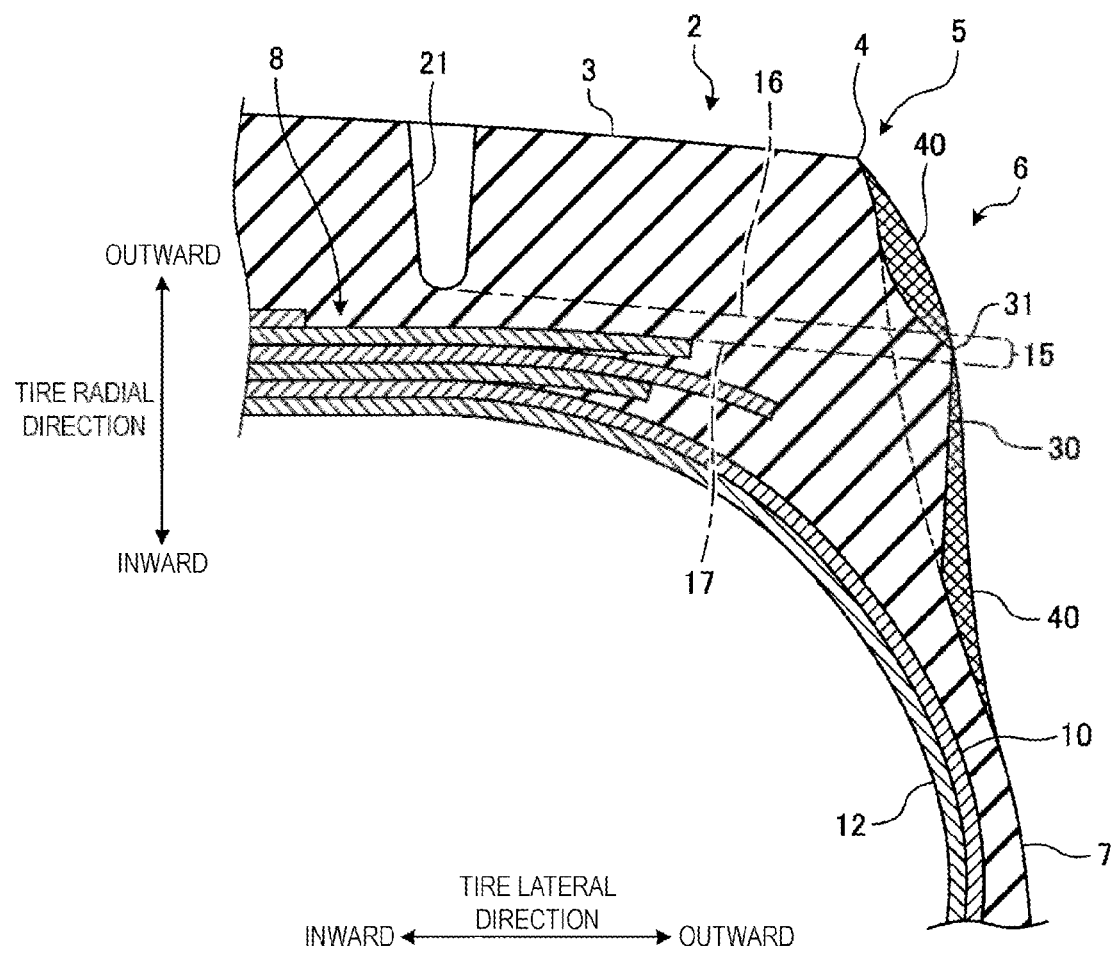
FIG. 5 is an explanatory diagram of a configuration in which a retreading development width is ensured by the shoulder shape being semi-rounded.

FIG. 5 is an explanatory diagram of a configuration in which the retreading development width is ensured by the shoulder shape being semi-rounded. To ensure the retreading development width when retreading, for example, as illustrated in FIG. 5, the shape of the buttress portion 6 located in the shoulder portion 5 region may be a semi-rounded shape, gently curved and projecting outward in the tire lateral direction. Accordingly, the buttress portion 6 projects outward in the tire radial direction, allowing the retreading development width to be ensured. However, in a configuration in which the buttress portion 6 is given a semi-rounded shape, the volume of rubber used in the shoulder portion 5 region is increased. A large volume of rubber means a larger volume of members generating heat due to deflection and the like when the vehicle is traveling. This causes an increase in the amount of heat build-up and a decrease in the ability to release heat. Accordingly, a configuration in which the shape of the shoulder portion 5 region is a semi-rounded shape has less heat build-up resistance than a configuration in which the buttress portion 6 extends inward from the shoulder portion 5 in the tire radial direction in a substantially straight manner and is not curved, projecting outward in the tire lateral direction, i.e., a square-shaped shoulder portion 5.

In contrast, in the pneumatic tire 1 according to an embodiment of the present technology, the retreading development width is similar to that of a configuration with a semi-rounded shaped buttress portion 6, and compared to a semi-rounded shaped buttress portion 6, the regions other than the protrusion portion 30 can be trimmed forming a trimmed portion 40. As a result, the volume of rubber used in the shoulder portion 5 region can be reduced. That is, because the protrusion portion 30 projects from the buttress portion 6 with a shape located within the retreading development width position 15, compared to a semi-rounded shaped buttress portion 6, the rubber in the region corresponding to the trimmed portion 40 on both sides of the corner portion 31 in the tire radial direction can be reduced. Thus, the amount of members generating heat when the vehicle is traveling can be reduced, reducing heat build-up. This is turn increases the ability to release heat in the shoulder portion 5 region.

In such a configuration, when the angle α of the linear portion 32 with respect to the horizontal line H is greater than 90°, the amount of rubber trimmed is reduced and the effect of suppressing heat build-up is reduced. When the angle α of the linear portion 32 with respect to the horizontal line H is less than 45°, the rigidity of the protrusion portion 30 is reduced. This can result in the rigidity in the end portion region in the tire lateral direction being reduced when the precure tread is bonded. In contrast, in the pneumatic tire 1 according to an embodiment of the present technology, the angle α of the linear portion 32 with respect to the horizontal line H is in the range 45°≤α≤90°. Thus, the amount of rubber and thus heat build-up can be suppressed. Also, because the rigidity of the protrusion portion 30 is ensured, the protrusion portion 30 can be used as a portion of the effective retreading development width when retreading. As a result of the foregoing, the retreading development width can be ensured while suppressing a decrease in heat build-up resistance.

Furthermore, the curved portion 35 is curved, projecting inward in the cross-sectional direction. This allows the amount of rubber trimmed from the position outward from the corner portion 31 in the tire radial direction to be reliably greater, compared to a configuration with a semi-rounded shaped shoulder portion 5 region. Thus, heat build-up can be further reliably suppressed. As a result, a decrease in heat build-up resistance related to ensuring the retreading development width can be further reliably suppressed.

Additionally, the curved portion 35 includes an end portion 36 on the side opposite the end portion located closer to the corner portion 31. Because the end portion 36 is located inward in the tire radial direction from the end portion 4 of the tread contact surface 3 in the tire lateral direction, the amount of rubber trimmed from the position outward from the corner portion 31 in the tire radial direction can be further increased. As a result, heat build-up can be further reliably suppressed. This allows a decrease in heat build-up resistance related to ensuring the retreading development width to be further reliably suppressed.

The distance L in the tire lateral direction from the carcass outer end portion 11 to the corner portion 31 is in the range 0 mm≤L≤30 mm. This allows the width of the portion in which the precure tread can be bonded when retreading to be further reliably ensured. The distance L' in the tire lateral direction from the inner end portion of the linear portion 32 in the tire radial direction to the carcass outer end portion 11 is in the range 0 mm≤L'≤30 mm.

This allows the rigidity of the portion of the protrusion portion 30 inward from the corner portion 31 in the tire radial direction to be ensured. Accordingly, the rigidity of the end portion region in the tire lateral direction can be ensured for bonding the precure tread, and the protrusion portion 30 can be used as a portion of the effective retreading development width when retreading. As a result of the foregoing, the retreading development width can be further reliably ensured.

The protrusion portion 30 is formed such that the distance D in the tire lateral direction from the end portion 4 of the tread contact surface 3 in the tire lateral direction to the carcass outer end portion 11 and the distance L in the tire lateral direction from the corner portion 31 to the carcass outer end portion 11 have a relationship within the range 0.5≤(L/D)≤0.7. This allows the retreading development width to be ensured while further reliably suppressing the amount of rubber. That is, when (L/D)<0.5 is true, the projection amount of the protrusion portion 30 is too great, and effective trimming of the amount of rubber may be difficult. When (L/D)>0.7 is true, the projection amount of the protrusion portion 30 is too low, and ensuring the retreading development width may be difficult. In contrast, when the protrusion portion 30 is formed such that the relationship is within the range 0.5≤(L/D)≤0.7, the retreading development width can be further reliably ensured, and the amount of rubber sufficient to ensure the retreading development width can be suppressed. This further reliably allows the retreading development width to be ensured while suppressing a decrease in heat build-up resistance.

Note that in the pneumatic tire 1 according to the embodiments described above, the linear portion 32 and the curved portion 35 are connected making the corner portion 31 of the protrusion portion 30 a portion bend, projecting outward in the tire lateral direction. However, the corner portion 31 may be formed in a shape other than a bent shape when viewed in a tire meridian cross section. For example, the corner portion 31 of the protrusion portion 30 may be a portion curved, projecting outward in the tire lateral direction, or may be formed as a flat surface with a predetermined width in the tire radial direction when viewed in a tire meridian cross section.

In the pneumatic tire 1 according to the embodiments described above, the protrusion portion 30 includes the curved portion 35 formed inward from the corner portion 31 in the tire radial direction, the curved portion 35 being curved, projecting inward in the cross-sectional direction. However, the portion outward from the corner portion 31 may be formed in a manner other than that of the curved portion 35. The portion of the protrusion portion 30 outward from the corner portion 31 in the tire radial direction, for example, may be curved, projecting outward in the cross-sectional direction, or may be formed in a linear manner, similar to that of the linear portion 32 located inward in the tire radial direction.

In the pneumatic tire 1 according to the embodiments described above, the curved portion 35 of the protrusion portion 30 includes the end portion 36 on the side opposite the end portion located closer to the corner portion 31. The end portion 36 is located inward in the tire radial direction from an end portion 4 of the tread contact surface 3 in the tire lateral direction. However, the end portion 36 of the curved portion 35 may be connected to the end portion 4 of the tread contact surface 3. That is, the protrusion portion 30 may be formed from the position of the end portion 4 of the tread contact surface 3.

EXAMPLES

FIGS. 6A to 6C are tables each showing the results of performance tests of pneumatic tires. In relation to the pneumatic tire described above, performance evaluation tests conducted on pneumatic tires of conventional examples and comparative examples and pneumatic tires according to embodiments of the present technology will be described below. In the performance evaluation tests, tests for heat build-up resistance, ensuring retread width, and rigidity of retread tread end portion were conducted.

The pneumatic tire used in the evaluation tests was a pneumatic tire having a nominal size defined by Japan Automobile Tyre Manufacturers Association (JATMA) of 245/70R19 that was mounted on the rim wheel of a JATMA standard rim having a size of 19.5×6.75 and adjusted to an air pressure of 660 kPa. In the evaluation tests for heat build-up resistance, an indoor drum test was conducted on each pneumatic tire to measure the temperature of the buttress portion after 7 hours of running at a speed of 80 km/h and a load of 20.19 kN. The evaluation results for heat build-up resistance were calculated as index values with the temperature of the buttress portion of the pneumatic tire of Conventional Example 1 described below being assigned the index value of 100. Larger values indicate resistance to heat build-up, and thus superior heat build-up resistance.

In the evaluation test for ensuring retread width, the pneumatic tires for testing were measured to determine how much tire is located outward from the end portion of the tread contact surface in the tire lateral direction for the precure tread to be bonded to. The evaluation results for ensuring retread width were calculated as index values with the projection amount outward in the tire lateral direction from the end portion of the tread contact surface of the pneumatic tire of Conventional Example 1 described below being assigned the index value of 100. Larger values indicate greater projection amounts outward in the tire lateral direction, and that a retreading development width is ensured.

In the evaluation tests for rigidity of retread tread end portion, an indoor drum test was conducted on each pneumatic tire after retreading with the tread, with each pneumatic tire being run for 150 hours at a speed of 80 km/h and a load of 20.19 kN. Thereafter, damage based on the number of cracks and the length of cracks in the buttress portion region was visually observed and evaluated by an evaluator. The evaluation results for rigidity of retread tread end portion were calculated as index values with the damage in the buttress portion 6 region of the pneumatic tire of Conventional Example 1 described below being assigned the index value of 100. Larger values indict less cracking in the buttress portion 6 region after retreading, and thus superior rigidity of retread tread end portion.

Evaluation test were conducted on 12 different pneumatic tires: the pneumatic tire of Conventional Example 1 and 2, which are examples of known pneumatic tires; Examples 1 to 6, which are pneumatic tires 1 according to embodiments of the present technology; and Comparative Examples 1 to 4, which are pneumatic tires for comparison with the pneumatic tires 1 according to embodiments of the present technology. Among these pneumatic tires, in the pneumatic tires of Conventional Examples 1 and 2, the protrusion portion is not disposed in the retread position of the buttress portion. In the pneumatic tires of Comparative Examples 1 to 4, the profile of the protrusion portion inward in the tire radial direction when viewed in a tire meridian cross section is a curved line or the profile inward in the tire radial direction is a straight line such that the angle α of the straight line with respect to the horizontal line H is not in the range $45° \leq \alpha \leq 90°$.

In Examples 1 to 6, which are pneumatic tires 1 according to embodiments of the present technology, the entire profile of the protrusion portion 30 inward in the tire radial direction when viewed in a tire meridian cross section is a straight line, and the angle α of the straight line with respect to the horizontal line H is in the range $45° \leq \alpha \leq 90°$. The pneumatic tires 1 according to Examples 1 to 6 differ in terms of the profile of the protrusion portion 30 inward in the tire radial direction when viewed in a tire meridian cross section and the distance L in the tire lateral direction between the corner portion 31 of the protrusion portion 30 and the carcass outer end portion 11. Note that, in FIGS. 6A to 6C, for the distance L in the tire lateral direction from the corner portion 31 to the carcass outer end portion 11, the direction from the position of the carcass outer end portion 11 in the tire lateral direction inward in the tire radial direction is defined as + (plus) and the direction from the position of the carcass outer end portion 11 outward in the tire radial direction is defined as − (minus).

As shown in FIGS. 6A to 6C, the results of the evaluation tests using the pneumatic tires 1 show that the pneumatic tires 1 of Examples 1 to 6 can suppress a decrease in heat build-up resistance, ensure rigidity of retread tread end portion, and ensure a retreading development width in a superior manner to the pneumatic tires of Conventional Examples 1 and 2, and Comparative Examples 1 to 4. That is, the pneumatic tires 1 according to Examples 1 to 6 can ensure a retreading development width while suppressing a decrease in heat build-up resistance.

The invention claimed is:

1. A pneumatic tire, comprising:
a plurality of circumferential main grooves extending in a tire circumferential direction and formed in a tread contact surface;
a belt layer having a multilayer structure including a plurality of layered belts;
a carcass layer provided in a continuous manner inward of the belt layer in a tire radial direction, the carcass layer having a main portion and a folded back portion where an end of the carcass layer in a tire lateral direction is folded back outward in the tire lateral direction at a position of a bead core, an axially outermost point of the main portion being an axially outermost point of the carcass layer; and
a protrusion portion projecting outward in the tire lateral direction disposed in a buttress portion and comprising a linear portion and a corner portion;
the linear portion having a linear shape when viewed in a tire meridian cross section, the linear portion constituting a surface of the protrusion portion at a position inward in the tire radial direction from the corner portion, and the corner portion being an outermost end portion of the protrusion portion outward in the tire lateral direction;
the corner portion being located within a retreading development width position, which is a range in the tire radial direction in which a boundary for removing a tread when retreading is located;
the linear portion having an angle ranging from 45° to 90° with respect to an imaginary line parallel with a tire rotation axis at a position inward of the linear portion in the tire lateral direction; and
the protrusion portion comprising an end portion outward in the tire radial direction from the corner portion, the end portion being located outward in the tire radial direction from the retreading development width position, and being located inward in the tire radial direction from an end portion of a tread contact surface in the tire lateral direction;
wherein:
the retreading development width position is defined as a region between a groove bottom side reference line and a belt side reference line;
the groove bottom side reference line is defined as an imaginary line parallel with a tread profile and running from a groove bottom of an outermost circumferential main groove of the plurality of circumferential main grooves;
the belt side reference line is defined as an imaginary line parallel with a tread profile and running from an end of an outermost layered belt of the plurality of layered belts in a region in the tire lateral direction in which the outermost circumferential main groove is located;
the protrusion portion comprises a curved portion constituting a surface of the protrusion portion at a position outward from the corner portion in the tire radial direction, the curved portion being curved, projecting inward in a cross-sectional direction when viewed in the tire meridian cross section;
the linear portion extending from the corner portion to a radially innermost end portion of the projection portion;
the corner portion of the protrusion portion shares the same position with the axially outermost point of the carcass layer in the tire lateral direction or is located inward from a position of the axially outermost point of the carcass layer in the tire lateral direction;
a distance L in the tire lateral direction from the carcass outer end portion, to the corner portion is in a range 0 mm $\leq$ L $\leq$ 30 mm; and
a distance L' in the tire lateral direction from an inner end portion of the linear portion in the tire radial direction to the carcass outer end portion is in a range 0 mm $\leq$ L' $\leq$ 30 mm.

2. The pneumatic tire according to claim 1, wherein
the curved portion comprises an end portion on a side opposite an end portion located closer to the corner portion, the end portion being located inward in the tire radial direction from an end portion of a tread contact surface in the tire lateral direction.

3. The pneumatic tire according to claim 1, wherein
a distance L in the tire lateral direction from a carcass outer end portion, which is an outermost portion of a carcass in the tire lateral direction, to the corner portion is in a range 0 mm≤L≤30 mm; and
a distance L' in the tire lateral direction from an inner end portion of the linear portion in the tire radial direction to the carcass outer end portion is in a range 0 mm≤L'≤30 mm.

4. The pneumatic tire according to claim 2, wherein
a distance L in the tire lateral direction from a carcass outer end portion, which is an outermost portion of a carcass in the tire lateral direction, to the corner portion is in a range 0 mm≤L≤30 mm; and
a distance L' in the tire lateral direction from an inner end portion of the linear portion in the tire radial direction to the carcass outer end portion is in a range 0 mm≤L'≤30 mm.

5. A pneumatic tire, comprising:
a plurality of circumferential main grooves extending in a tire circumferential direction and formed in a tread contact surface;
a belt layer having a multilayer structure including a plurality of layered belts;
a carcass layer provided in a continuous manner inward of the belt layer in a tire radial direction, the carcass layer having a main portion and a folded back portion where an end of the carcass layer in a tire lateral direction is folded back outward in the tire lateral direction at a position of a bead core, an axially outermost point of the main portion being an axially outermost point of the carcass layer; and;
a protrusion portion projecting outward in the tire lateral direction disposed in a buttress portion and comprising a linear portion and a corner portion;
the linear portion having a linear shape when viewed in a tire meridian cross section, the linear portion constituting a surface of the protrusion portion at a position inward in the tire radial direction from the corner portion, and the corner portion being an outermost end portion of the protrusion portion outward in the tire lateral direction;
the corner portion being located within a retreading development width position, which is a range in the tire radial direction in which a boundary for removing a tread when retreading is located;
the linear portion having an angle ranging from 45° to 90° with respect to an imaginary line parallel with a tire rotation axis at a position inward of the linear portion in the tire lateral direction; and
the protrusion portion comprising an end portion outward in the tire radial direction from the corner portion, the end portion being located outward in the tire radial direction from the retreading development width position, and being located inward in the tire radial direction from an end portion of a tread contact surface in the tire lateral direction;
wherein:
the retreading development width position is defined as a region between a groove bottom side reference line and a belt side reference line;
the groove bottom side reference line is defined as an imaginary line parallel with a tread profile and running from a groove bottom of an outermost circumferential main groove of the plurality of circumferential main grooves;
the belt side reference line is defined as an imaginary line parallel with a tread profile and running from an end of an outermost layered belt of the plurality of layered belts in a region in the tire lateral direction in which the outermost circumferential main groove is located;
the corner portion of the protrusion portion shares the same position with the axially outermost point of the carcass layer in the tire lateral direction or is located inward from a position of the axially outermost point of the carcass layer in the tire lateral direction;
a distance L in the tire lateral direction from the carcass outer end portion, to the corner portion is in a range 0 mm≤L≤30 mm.

* * * * *